(12) United States Patent
Alimi et al.

(10) Patent No.: US 12,496,180 B2
(45) Date of Patent: Dec. 16, 2025

(54) VASCULAR PROSTHESIS

(71) Applicants: Université d'Aix-Marseille, Marseilles (FR); ASSISTANCE PUBLIQUE—HÔPITAUX DE MARSEILLE, Marseilles (FR); Université Gustave Eiffel, Champs-sur-Marne (FR)

(72) Inventors: Yves Simon Alimi, Marseilles (FR); Frédéric Mouret, Castelnau le Lez (FR); Vincent Garitey, Marseilles (FR)

(73) Assignees: UNIVERSITE D'AIX MARSEILLE, Marseilles (FR); ASSISTANCE PUBLIQUE—HÔPITAUX DE MARSEILLE, Marseilles (FR); UNIVERSITÉ GUSTAVE EIFFEL, Champs-sur-Marne (FR)

( * ) Notice: Subject to any disclaimer, the term of this patent is extended or adjusted under 35 U.S.C. 154(b) by 838 days.

(21) Appl. No.: 17/754,352

(22) PCT Filed: Oct. 5, 2020

(86) PCT No.: PCT/EP2020/077893
§ 371 (c)(1),
(2) Date: Mar. 30, 2022

(87) PCT Pub. No.: WO2021/064256
PCT Pub. Date: Apr. 8, 2021

(65) Prior Publication Data
US 2022/0370192 A1    Nov. 24, 2022

(30) Foreign Application Priority Data
Oct. 3, 2019   (EP) .................................... 19306279

(51) Int. Cl.
*A61F 2/06* (2013.01)
*A61F 2/07* (2013.01)
(Continued)

(52) U.S. Cl.
CPC ................ *A61F 2/064* (2013.01); *A61F 2/07* (2013.01); *A61F 2/844* (2013.01);
(Continued)

(58) Field of Classification Search
CPC .......... A61F 2/856; A61F 2/064; A61F 2/844; A61F 2/07
See application file for complete search history.

(56) References Cited

U.S. PATENT DOCUMENTS 6,093,203 A * 7/2000 Uflacker ................. A61F 2/915
623/1.18
2001/0047198 A1   11/2001 Drasler et al.
(Continued)

FOREIGN PATENT DOCUMENTS

| EP | 0951251 B1 | 3/2005 |
|---|---|---|
| WO | 2009065917 A1 | 5/2009 |
| WO | 2015132480 A1 | 9/2015 |

OTHER PUBLICATIONS

International Search Report issued in International Application No. PCT/EP2020/077893, mailed Jan. 20, 2021 (4 pages).
(Continued)

*Primary Examiner* — Jerrah Edwards
*Assistant Examiner* — Teresa M Dudden
(74) *Attorney, Agent, or Firm* — Osha Bergman Watanabe & Burton LLP

(57) ABSTRACT

A vascular prosthesis configured to be implanted in a vessel, having substantially a T-shape, comprises a proximal tubular part forming the base of the "T" and a distal tubular part forming the head of the "T". The proximal tubular part has
(Continued)

a first lumen, the distal tubular part has a second lumen, and the first and second lumens are fluidly connected to form a common lumen. The distal tubular part comprises a first end portion, a second end portion, and an intermediate portion extending axially between the first and second end portions. The first and second end portions are radially expandable. The proximal tubular part is connected to the intermediate portion and the second end portion is movable between a retracted position in which the second end portion is axially restrained and a deployed position in which the second end portion is axially deployed.

13 Claims, 3 Drawing Sheets

(51) Int. Cl.
*A61F 2/844* (2013.01)
*A61F 2/82* (2013.01)
*A61F 2/856* (2013.01)
*A61F 2/915* (2013.01)

(52) U.S. Cl.
CPC ... *A61F 2002/065* (2013.01); *A61F 2002/825* (2013.01); *A61F 2/856* (2013.01); *A61F 2/915* (2013.01)

(56) References Cited

U.S. PATENT DOCUMENTS

| | | | |
|---|---|---|---|
| 2004/0019374 A1* | 1/2004 | Hojeibane | A61F 2/2415 623/2.38 |
| 2004/0138737 A1 | 7/2004 | Davidson et al. | |
| 2005/0027344 A1* | 2/2005 | Eidenschink | A61F 2/954 977/847 |
| 2009/0264991 A1* | 10/2009 | Paul, Jr. | A61F 2/954 623/1.35 |
| 2013/0204360 A1* | 8/2013 | Gainor | A61F 2/2403 623/2.18 |
| 2014/0243965 A1* | 8/2014 | Benson | A61F 2/2418 623/2.18 |

OTHER PUBLICATIONS

Written Opinion issued in International Application No. PCT/EP2020/077893; Dated Jan. 20, 2021 (7 pages).

* cited by examiner

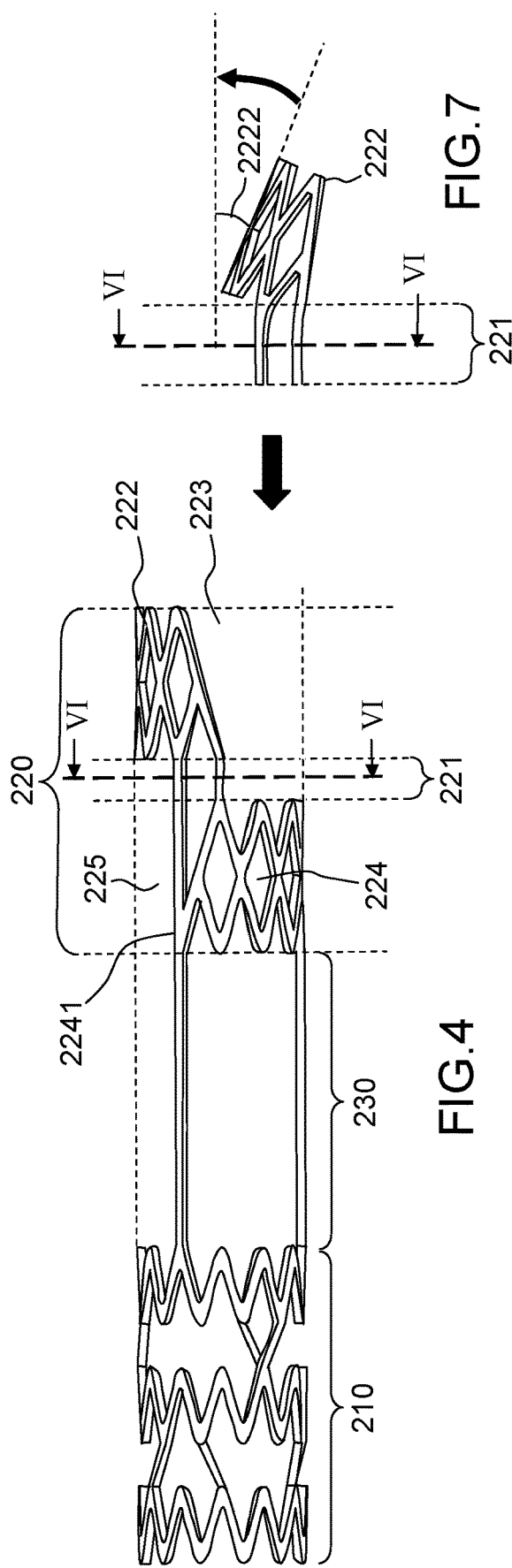
FIG.4
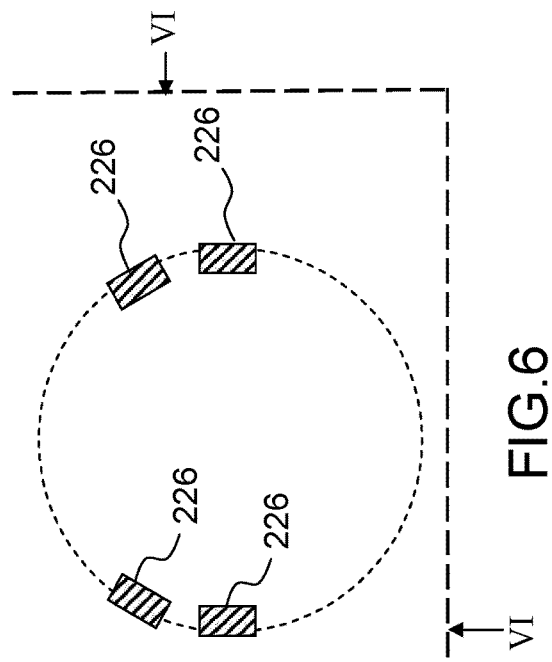
FIG.7
FIG.6
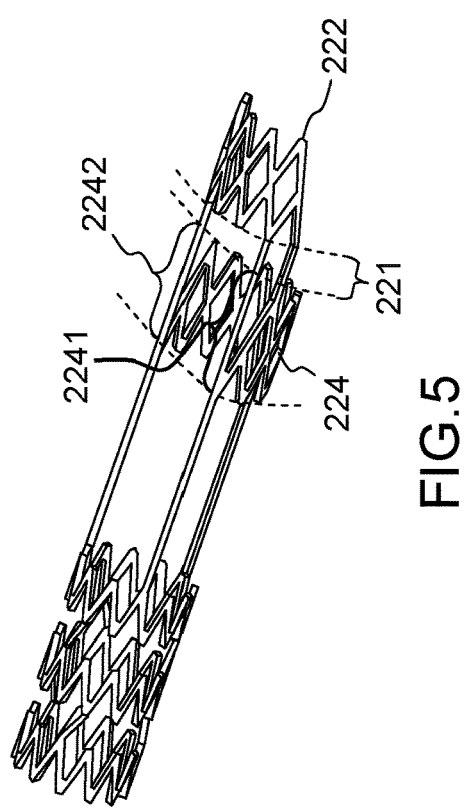
FIG.5

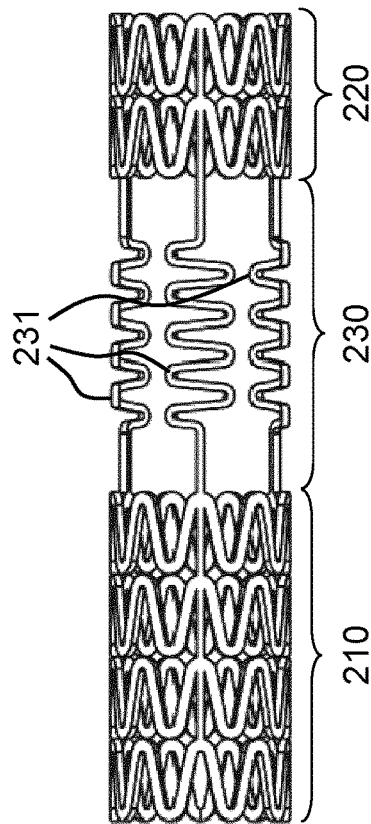
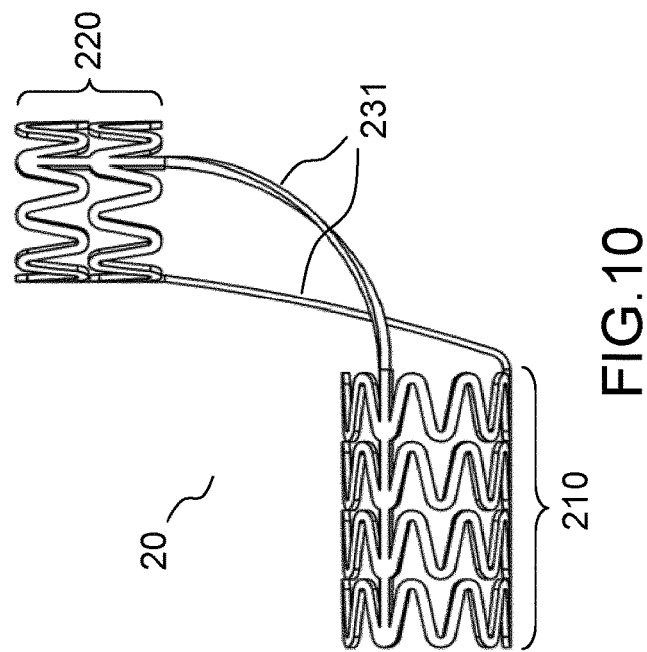
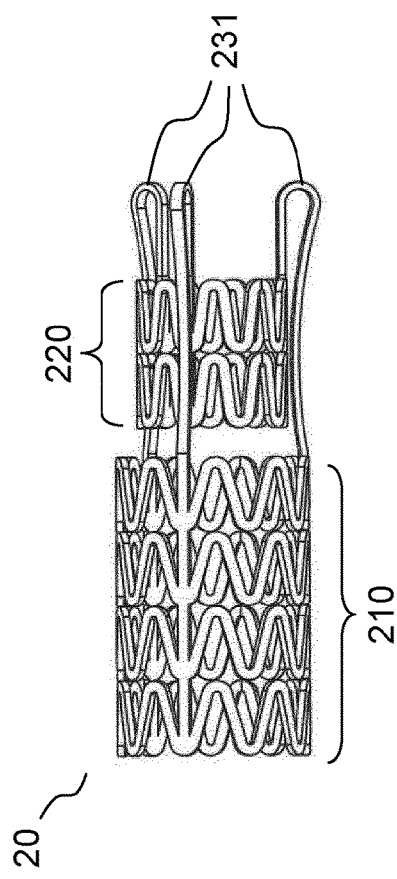

VASCULAR PROSTHESIS

TECHNICAL FIELD

The present disclosure concerns, but is not limited to, a vascular prosthesis configured to be implanted in a vessel, having substantially a T-shape. The present disclosure also concerns an implantation sheath comprising such a vascular prosthesis.

TECHNICAL BACKGROUND

The number of surgical operations involving anastomosis that are performed each year rises all the more that the number of elderly people increases. Conventional vascular prosthesis implant procedures suffer from defaults related with their accuracy, duration, and complexity.

One way to improve the non-invasiveness of vascular surgery is the absence of clamping during implantation, such as described, for example, in the patent document WO 2009/065917. The absence of clamping allows mitigating ischemia. However, because of the blood flow, the introduction, placement and seal of a connection must be done accurately, quickly and simply to avoid major or even fatal blood loss. Patent document WO 2009/065917 describes a complex implantation technique involving inflation of a balloon, with a high risk of damaging the blood vessel's wall during maneuvers.

GENERAL PRESENTATION

In what follows, the term "comprise" is synonym of (means the same as) "include" and "contains", is inclusive and open, and does not exclude other non-recited elements. Moreover, in the present disclosure, when referring to a numerical value, the terms "about" and "substantially" are synonyms of (mean the same as) a range comprised between 80% and 120%, preferably between 90% and 110%, of the numerical value.

The present disclosure concerns a vascular prosthesis configured to be implanted in a vessel, in particular a blood vessel. For example, the vascular prosthesis may be implanted perpendicular to a transparietal puncture made in a vessel beforehand, and through which the vascular prosthesis is inserted.

The vascular prosthesis according to the present disclosure may be suitable for a wide variety of therapeutic uses. Such therapeutic uses may include surgical anastomosis, e.g., side-to-end anastomosis of vessels, such as blood vessels. In the present disclosure, by "anastomosis", it is meant a connection or opening between two cavities or passages that are normally diverging or branching, such as between vessels, e.g., blood vessels. The two cavities or passages may for example branch and form part of a same blood vessel. Blood vessels that are deemed to necessitate surgical anastomosis may for example be subjected to stenosis, i.e., an abnormal occlusion of the vessel.

In particular, the vascular prosthesis of the present disclosure may allow to perform a clampless surgical anastomosis with a simpler implantation technique.

According to a first aspect of the present disclosure, there is provided a vascular prosthesis configured to be implanted in a vessel, having substantially a T-shape, comprising a proximal tubular part forming the base of the "T" and a distal tubular part forming the head of the "T", wherein: the proximal tubular part has a first lumen, the distal tubular part has a second lumen, and the first and second lumens are fluidly connected to form a common lumen, wherein:
the distal tubular part comprises a first end portion, a second end portion, and an intermediate portion extending axially between the first and second end portions,
the first and second end portions are radially expandable,
the proximal tubular part is connected to the intermediate portion, and
the second end portion is movable between a retracted position in which the second end portion is axially restrained and a deployed position in which the second end portion is axially deployed.

The vascular prosthesis has substantially a T-shape, in the sense that the proximal tubular part forms the base or vertical bar of the "T", and the distal tubular part forms the head or horizontal bar of the "T". The common lumen fluidly connects the proximal and distal tubular parts of the vascular prosthesis. In other words, the common lumen extends through the proximal tubular part and through the distal tubular part, and also has substantially a T-shape. The first lumen extends through the proximal tubular part. The second lumen extends through the distal tubular part, from the first end portion through the intermediate portion and through the second end portion. The first lumen opens to the exterior at the proximal end, or free end, of the proximal tubular part. The second lumen opens to the exterior at the distal ends, or free ends, of the distal tubular part In the present disclosure, an axial direction is the direction of the central axis of a tubular part, and a radial direction is a direction perpendicular to said central axis. Similarly, an axial plane is a plane containing the central axis and a radial plane is a plane perpendicular to the central axis. The adverbs "axially" and "radially" refer to the axial and radial direction, respectively.

In the present disclosure, by the expression "the second end portion is movable between a retracted position in which the second end portion is axially restrained and a deployed position in which the second end portion is axially deployed", it is meant:
that the second end portion is movable between at least two positions, i.e., a retracted position and a deployed position; and
that the distance between the axial projection of the distal extremity of the second end portion, on one hand, and the virtual point of junction between the head and the base of the "T" on the other hand, is shorter in the retracted position than in the deployed position. The meaning of "axially restrained" (as opposed to "axially deployed") is thus related to this shortened distance in the retracted position. The virtual point of junction of the two bars of the T in the prosthesis is considered as the reference point in both positions: when the second end portion is in the retracted position and when the second end portion is in the deployed position. In both positions, the distal extremity of the second end portion is the most remote point pertaining to the second end portion, relative to the reference point. The "axial projection of the distal extremity of the second end portion" is the orthogonal projection on the central axis of the distal tubular part forming the head of the T.

Such a configuration of the vascular prosthesis in which the second end portion is axially restrained in a retracted position allows minimizing the space occupied by the distal tubular part of the vascular prosthesis prior to its implantation in a vessel. This property of the prosthesis is particularly useful during a surgical intervention, by facilitating the implantation of the prosthesis in a vessel, and/or by reducing the invasiveness of surgery. For example, the axial restraint imposed on the second end portion in the retracted state facilitates the incorporation of the prosthesis into a device for implanting the prosthesis, for example an introduction catheter, and also facilitates the penetration and positioning of said device within a vessel.

The vascular prosthesis according to the first aspect of the present disclosure aims thus at improving conventional side-to-end anastomosis techniques, by providing, among other advantages, a less invasive surgical approach. The inventors have further shown that, compared to classic surgical anastomosis, the use of vascular prostheses according to one or more embodiments of the present disclosure offers advantages, such as, for example, a reduction in skin incision, a reduction in the vessel dissection zone, the avoidance of the use of arterial clamps (upstream and downstream the vessel), the avoidance of a suture by a vascular thread, the avoidance of the placement of a drain, and/or the reduction in the duration of anastomosis. During the implantation of the prosthesis, when no clamp is used to interrupt blood flow, the blood flux goes from upstream of the vessel to downstream of the vessel. Reduction in the duration of anastomosis decreases ischemia of the organs downstream of the vessel in which the vascular prosthesis is configured to be implanted.

Very advantageously, such positive effects stemming from the design of the vascular prosthesis according to the present disclosure is accompanied by a substantial decrease in complication rates and shortening of the hospital stays, e.g., divided by two, and represents a further step towards ambulatory surgery.

The size of the vascular prosthesis according to the present disclosure may be adapted to the vessel's dimensions in which the vascular prosthesis is configured to be implanted. For example the diameter of the width of the distal tubular part may be comprised between 1 mm and 50 mm, in particular between 2 mm and 25 mm.

The first and second end portions are radially expandable, thereby allowing the distal tubular part of the prosthesis to adhere to a vessel wall in which the prosthesis is configured to be implanted, through their radial force. For example the first and second end portions may both comprise a stent comprising a self-expandable material. Said self-expandable material may for example be a superelastic alloy (e.g., Nitinol®).

According to one or more embodiments, the vascular prosthesis comprises at least one covering layer or graft, i.e., a fabric having substantially a circular cross-sectional configuration and running along the "T" of the vascular prosthesis, either partly or totally along the surface of the "T". According to one or more embodiments, the graft may comprise a material which is waterproof and blood tight. Such a material may for example be selected in the group comprising polytetrafluoroethylene (PTFE), a woven or knitted polyester (e.g., Dacron®).

In certain embodiments, the vascular prosthesis comprises at least one stent. In the present disclosure, by "stent", it is meant a tubular frame, for example a frame comprising struts. Such a tubular frame is not necessarily closed circumferentially. The at least one stent comprised in the vascular prosthesis may be covered and embedded in the covering layer or graft comprised in the vascular prosthesis. The at least one stent may be attached to the graft, e.g., by adhesive or by suturing.

According to one or more embodiments, the second end portion comprises a folding region, so that, in the retracted position, the second end portion can be folded along the folding region so as to be partly inverted within the second lumen.

The term "inverted within" is hereby broadly defined as meaning "folded within" or "folded from the outside to the inside". Referring to the embodiment wherein the second end portion can be folded along the folding region so as to be partly inverted within the second lumen, the terms "partly inverted within" means that a part of the wall of the second end portion, which is an external wall of the second end portion in the deployed state, is folded within the second lumen.

The folding region may be substantially in greater tensile stress in folding than are the remaining regions of the second end portion, so that, in the retracted position, the second end portion can be folded along the folding region so as to be partly inverted within the second lumen. Such a configuration of the second end portion may render the second end portion axially restrained in the retracted position. However, in certain embodiments of the present disclosure, the axial restraint of the second end portion may result from the combination of such folding along the folding region with a different feature of the vascular prosthesis, such as, for example, the elastic deformability of the intermediate portion of the distal tubular part.

In certain embodiments, the second end portion comprises a distal end with a circumferential indentation, or scallop. The circumferential indentation may be present on about 15% to 50% of the circumference of the distal end. The indentation facilitates the folding along the folding region of the second end portion.

In certain embodiments, the second end portion further comprises a frame that is not inverted within the second lumen in the retracted position, and that is axially offset with respect to the distal end in the deployed position. The frame has the shape of an open annular ring in a radial cross-section of the second end portion, with two ridges defining a circumferential gap therebetween. Said circumferential gap may be radially opposed to and axially offset with respect to the indentation in the deployed position.

In certain embodiments, the folding region extends axially between the frame and the distal end of the second end portion in the deployed position.

In certain embodiments, the folding region comprises at least one pair of arms which are circumferentially offset. In particular, the arms of a pair may be substantially diametrically opposed.

In certain embodiments, the arms are less rigid than the frame and/or are arranged on less than 50% of the circumference of the second end portion. In particular, the arms may be arranged on less than 20% of the circumference of the second end portion.

In certain embodiments, the frame comprises stent struts.

In certain embodiments, the intermediate portion is elastically deformable between an unstable state and a stable state, and the deformation of the intermediate portion from the unstable state to the stable state makes the second end portion move from the retracted position to the deployed position.

In certain embodiments, the intermediate portion comprises at least two arms extending in the axial direction of the distal tubular part.

In certain embodiments, when the intermediate portion is in the unstable state, the at least two arms of the intermediate portion are in one of the following configurations or in a combination thereof:
   axially pleated;
   bent;
   constrained in a twisted manner.

In certain embodiments, when the intermediate portion is in the unstable state, the second end portion is fully inverted within the second lumen. In particular, in certain embodiments, the at least two arms are bent when the intermediate portion is in the unstable state, so that the second end portion is fully inverted within the second lumen.

The present disclosure further concerns an implantation device comprising the foregoing vascular prosthesis. The device according to the second aspect may comprise a sheath having a perforating head for penetrating a vessel. For example, such a perforating head may comprise a perforation nose having a conical shape. The conical shape may facilitate the penetration of the device in the vessel, by softly dilating the puncture opening made in the vessel.

Other features and advantages of the invention will become apparent from the following detailed description, taken in conjunction with the accompanying drawings, which illustrate, by way of example, the principles of the invention.

BRIEF DESCRIPTION OF THE DRAWINGS

In the drawings, like reference signs generally refer to the same or like parts throughout the different views.

The drawings are not necessarily to scale, emphasis instead generally being placed upon illustrating the principles of the invention.

FIG. 4 is a side view of a diagrammatic representation of an uncovered distal tubular part of a vascular prosthesis, with its second end portion in the deployed position.

FIG. 5 is a top perspective view of the distal tubular part shown in FIG. 4.

FIG. 6 is a radial cross-section along plane VI-VI of the distal tubular part of FIG. 4.

FIG. 7 is an enlarged view of the distal tubular part of FIG. 4, focusing on the distal end of the second end portion when the latter is in a retracted position.

FIG. 8 is a side view of a diagrammatic representation of another example of an uncovered distal tubular part of a vascular prosthesis, with its second end portion in the retracted position, wherein the intermediate portion of the distal tubular part shows pleated arms.

FIG. 9 is a side view of a diagrammatic representation of another example of an uncovered distal tubular part of a vascular prosthesis with its second end portion in the retracted position, wherein the intermediate portion of the distal tubular part shows bent arms.

FIG. 10 is a side view of a diagrammatic representation of another example of an uncovered distal tubular part of a vascular prosthesis with its second end portion in the retracted position, wherein the intermediate portion of the distal tubular part shows twisted arms.

DETAILED DESCRIPTION OF EXAMPLES

Examples of vascular prostheses will now be described in detail with reference to the accompanying figures. In the following detailed description, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

The following description provides non-limiting examples of vascular prostheses according to the present disclosure. The description further provides non-limiting details about devices for implanting the vascular prosthesis of the invention, as well as details concerning potential applications of such prosthesis.

Figure 1:
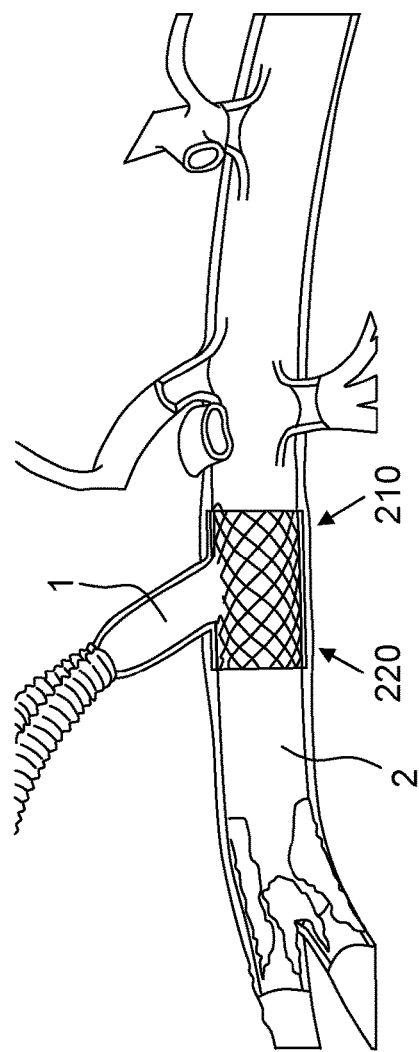
FIG. 1 is a diagrammatic representation of an example of a vascular prosthesis, which is implanted in a stenosed blood vessel.

FIG. 1 illustrates a vascular prosthesis 1 which is implanted in a stenosed blood vessel 2. In the vessel 2, the blood flux goes from the right (upstream) to the left (downstream). The second end portion 220 of the distal tubular part of the vascular prosthesis is positioned downstream, as opposed to the first end portion 210, which is positioned upstream.

Figure 3:
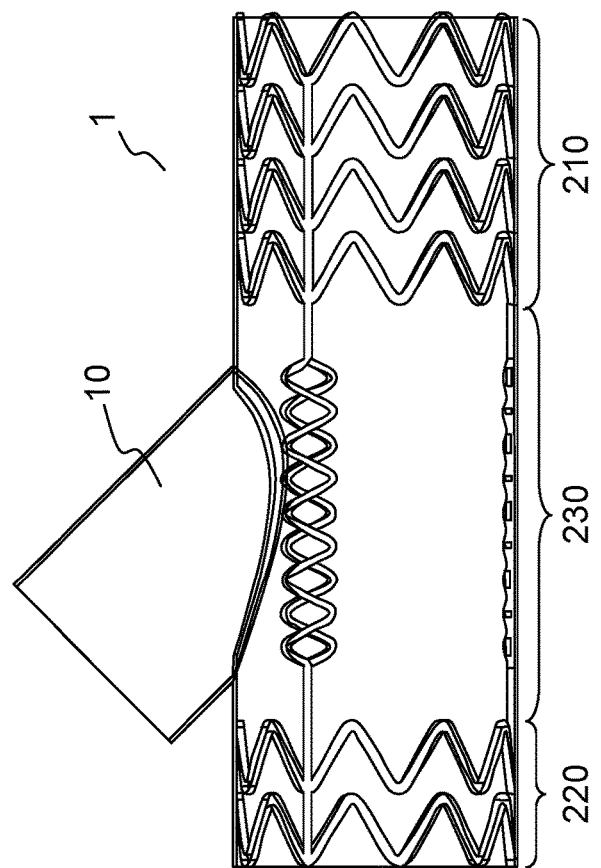
FIG. 3 is a side view of the vascular prosthesis shown in FIG. 2.
Figure 2:
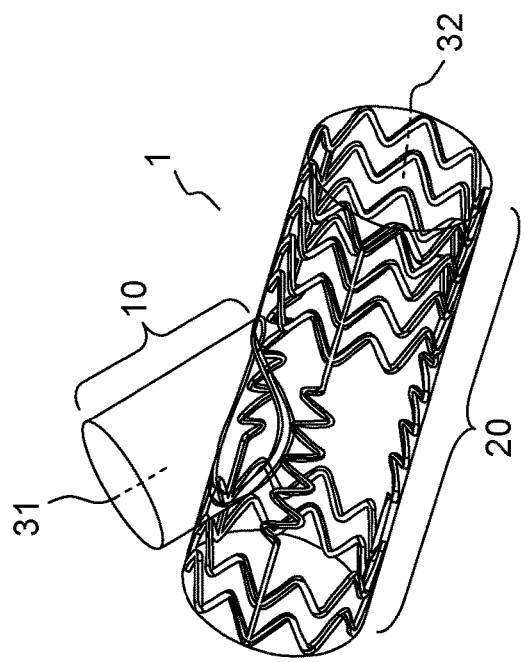
FIG. 2 is a perspective view of a diagrammatic representation of a part of another example of a vascular prosthesis.

FIGS. 2 and 3 show a side view and a perspective view, respectively, of a schematic representation of another example of a vascular prosthesis 1, wherein the proximal tubular part 10 is partly shown. The vascular prosthesis 1 is configured to be implanted in a vessel 2 (not shown in FIGS. 2 and 3).

As illustrated in FIG. 2, the vascular prosthesis 1 has substantially a T-shape, and comprises a proximal tubular part 10 forming the base of the "T" and a distal tubular part 20 forming the head of the "T". The proximal tubular part 10 has a first lumen 31, the distal tubular part 20 has a second lumen 32, and the first and second lumens 31, 32 are fluidly connected to form a common lumen. The common lumen has substantially a T-shape, the first lumen 31 forming the base of the "T", and the second lumen forming the head of the "T". However, as illustrated, the base of the "T" is not strictly perpendicular to the head of the "T". In other words, the angle formed between the base and the head of the "T" is not strictly equal to 90° and may be comprised between 100 and 90°.

As illustrated in FIG. 3, the distal tubular part 20 comprises a first end portion 210, a second end portion 220, and an intermediate portion 230 extending axially between the first and second end portions.

The first and second end portions 210, 220 are radially expandable. This means that the first and second end portions 210, 220 may each move from a radially compressed state to a radially deployed state. In the radially deployed state, the circumference of the first and second end portions 210, 220 is bigger than in the radially compressed state. For example, the first and second end portions 210, 220 may each comprise a stent made of a self-expendable material, such as Nitinol®.

The proximal tubular part 10 is connected to the intermediate portion 230. This may be achieved, for example, by a covering layer or graft comprised in the prosthesis and covering both the proximal tubular part 10 and the distal tubular part 20, such as illustrated in FIGS. 2-3. The graft may comprise materials suitable for being included into vascular prostheses configured to be implanted in blood vessels, such as, for example, PTFE.

According to the present disclosure, the second end portion 220 is movable between a retracted position in which the second end portion 220 is axially restrained and a deployed position in which the second end portion 220 is axially deployed. The prosthesis illustrated in FIG. 1 and the prosthesis illustrated in FIGS. 2-3 both have a deployed position and a retracted position, and are both illustrated in the deployed position in the Figures. In both cases, when the prosthesis goes from its retracted position to its deployed position, the second end portion 220 may move from its retracted positon to its deployed position. Either simultaneously or consecutively, the first and second end portions 210, 220 may radially expand, by moving from their radially compressed state to their radially deployed state.

Another example of a vascular prosthesis is illustrated in FIGS. 4-7.

FIG. 4 shows a side view of the distal tubular part of the vascular prosthesis comprising a first end portion 210, an intermediate portion 230 and a second end portion 220, wherein the second end portion 220 is in the deployed position. The distal tubular part also comprises a covering layer or graft which is not shown in the Figures. As shown in FIG. 4, the second end portion 220 comprises a folding region 221, so that, in the retracted position, the second end portion 220 can be folded along the folding region 221 so as to be partly inverted within the second lumen 32, as shown in FIG. 7.

In the example of prosthesis illustrated in FIG. 4, the second end portion 220 comprises a distal end 222 with a circumferential indentation 223. The second end portion 220 further comprises a frame 224 that is not inverted within the second lumen 32 in the retracted position. As shown in FIG. 4, the frame 224 is axially offset with respect to the distal end 222 in the deployed position. In a radial cross-section (not shown) of the second end portion 220, the frame 224 has substantially the shape of an open annular ring.

FIG. 5 shows a perspective top-side view of the same distal tubular part illustrated in FIG. 4. FIG. 5 highlights that the frame 224 comprises two ridges 2241 and 2242. In radial cross section, these two ridges 2241 and 2242 correspond to the two free ends of the open annular ring. A circumferential gap 225 is defined between these two ridges 2241 and 2242. In the deployed position, as further shown in FIG. 4, the circumferential gap 225 is radially opposed to the indentation 223 and is axially offset with respect to the indentation 223.

The folding region 221 extends axially between the frame 224 and the distal end 222 in the deployed position. The folding region 221 comprises at least one pair of arms 226 which are circumferentially offset, i.e., are arranged at different positions on the circumference of the second end portion 220. In particular, the arms may be arranged on opposite sides of the circumference. For example, as illustrated in FIG. 6, a first arm of group of arms and a second arm of group of arms may be arranged symmetrically with respect to an axial plane of the distal tubular part.

In the example illustrated in FIGS. 4-7, the folding region 221 comprises two pairs of arms 226. The arms 226 are arranged on less than 20% of the circumference of the second end portion 220, as can be seen in FIG. 6, which is a radial cross-sectional view of the folding region 221 along plane VI-VI.

The arms 226 may be less rigid than the frame 224. For example, the arms 226 and the frame 224 may be formed substantially from the same material, but the arms 226 may have a lower thickness than the frame 224. In another example, the difference in rigidity may stem from the difference in circumferential distribution of the frame 224 and the arms 226, e.g. the frame 224 may be arranged on a bigger part of the circumference of the second end portion 220 than the arms 226.

In this example, the frame 224 comprises stent struts.

In the retracted position, the second end portion 220 is folded along the folding region 221 so as to be partly inverted within the second lumen, as illustrated in FIG. 7. Such a folding renders the second end portion axially restrained in this example. In other examples, the axial restraint of the second end portion 220 may result from the combination of a folding movement along the folding region 221 with the elastic deformability of the intermediate portion 230 of the vascular prosthesis, the latter being illustrated in FIGS. 8-10.

A deployment angle is designated by reference 2222 in FIG. 7. Such deployment angle can be defined as the angle of movement of the second end portion from a retracted position in which the second end portion is axially restrained, as in FIG. 7, to a deployed position in which the second end portion is deployed, as in FIG. 4. In the example of vascular prosthesis illustrated in FIGS. 4-7, the deployment angle 2222 is the angle of folding of the second end portion 220 along the folding region 221, and is less than 45°. However, in other examples, the deployment angle may for example be comprised between 100 and 170°.

FIGS. 8-10 are referring to examples wherein the intermediate portion 230 is elastically deformable between an unstable state and a stable state, and wherein the deformation of the intermediate portion 230 from an unstable state to a stable state, makes the second end portion 220 move from the retracted position to the deployed position.

In the three different examples illustrated in FIGS. 8-10, the distal tubular part 20 is shown without its covering layer, and the intermediate portion 230 comprises at least two arms 231 extending in the axial direction of the distal tubular part 20. In particular, the intermediate portion 230 comprises three arms 231 which are regularly arranged around the distal tubular part 20. In this example, the three arms 231 are angularly distributed at 0°, 120° and 240° around the central axis of the distal tubular part 20. In all FIGS. 8-10, the second end portion 220 is shown in the retracted position, i.e., the position in which the second end portion 220 is axially restrained.

In the example illustrated in FIG. 8, the arms 231 are axially pleated when the intermediate portion 230 is in the unstable state. The pleating of the arms 231 may be tailored in different ways, as long as the arms 231 are shorter in the unstable state than in the stable state of the intermediate portion 230. For example, the main direction of the arms 231 may be substantially parallel to the central axis of the distal tubular part in both the unstable state and the stable state of the intermediate portion 231. In the example of FIG. 8, the arms 231 have a regular sinusoidal shape when the second end portion is in the retracted position. Such sinusoidal shape may be maintained upon deployment of the second end portion 220, i.e., upon movement of the second end portion 220 from the retracted position to the deployed position, and may be maintained also in the deployed position. However, in the latter case, the distance between two peaks of the regular sinusoid is greater than in the retracted position, so that the arms are shorter in the unstable state than in the stable state of the intermediate portion 230.

In the example illustrated in FIG. 9, the three arms 231 are bent when the intermediate portion 230 is in the unstable state, so that the second end portion 220 is fully inverted within the second lumen 32. In this example, the three arms 231 have substantially the same length. In related examples (not shown), at least one arm may be shorter or longer than the other(s), but all arms need to bend at a same distance of the intermediate portion 230 when the intermediate portion 230 is in the unstable state, such as illustrated in FIG. 9. Such bending may be achieved, for example, by distributing the arms 223 around the central axis of the distal tubular part 20 more scarcely than other parts of the distal tubular part 20. Alternatively or additionally, a portion of material substantially less rigid than the main material composing the arms 231 may be positioned substantially at said same distance of the intermediate portion 230. Alternatively or additionally, the arms 231 may be substantially less thick than the other regions of the distal tubular part 20.

In the example illustrated in FIG. 10, the intermediate portion 230 comprises three arms 231 but only two appear in the Figure (because the image of one arm is superimposed on the image of another arm). As shown in FIG. 10, the arms are constrained in a twisted manner when the intermediate portion 230 is in the unstable state. In this example, the deployment angle, as defined above, i.e., the angle of movement of the second end portion from a retracted position in which the second end portion is axially restrained, to a deployed position in which the second end portion is deployed, is substantially equal to 90°. However, in other related examples wherein the arms of the intermediate portion are constrained in a twisted manner, the deployment angle may be substantially different from 90°, and comprised in the range [strictly greater than 0°, strictly less than 180° ], in particular comprised between 10° and 170°, and for example substantially equal to 45°.

Embodiments wherein the intermediate portion is elastically deformable between an unstable state and a stable state, and wherein the deformation of the intermediate portion 230 from an unstable state to a stable state makes the second end portion 220 move from the retracted position to the deployed position, as illustrated by the non-limiting FIGS. 8-10 may also, as indicated above, be combined with the embodiment illustrated in FIGS. 4-7, in the sense that the axial restraint of the second end portion may result from the combination of the folding along a folding region, as illustrated in FIGS. 4-7, with the elastic deformability of the intermediate portion illustrated in FIGS. 8-10.

The vascular prosthesis may be implanted by means of a sheath incorporating the vascular prosthesis and having a perforating head for penetrating a vessel and carrying out a transparietal puncture in said vessel. This allows, among other features, the part of the sheath incorporating the vascular prosthesis to be inserted in the vessel.

Once inserted in the transparietal puncture of a vessel and correctly positioned, the second end portion of the distal tubular part of the vascular prosthesis may be moved to a deployed position in which the second end portion is axially deployed, and, either simultaneously or consecutively, the first and second end portions may radially expand and adhere to the vessel's wall, so that the vascular prosthesis remains implanted in the vessel, due to the radial force of the first and second end portions.

The implantation sheath may include additional features that may ease the implantation of the vascular prosthesis in the vessel, such as a guide, for example, a hydrophilic guide. During an implantation procedure, such a guide may be used to insert the prosthesis within a vessel, and perform the positioning of the first end portion of the prosthesis in the upstream part of the vessel.

The sheath may further include features that may ease the automatic deployment of the prosthesis, i.e., the axial deployment of the second end portion and/or the radial expansion of the first and second end portions. The latter features may for example be selected in the group comprising a tear-away sheath, a ripcord, and mechanical clamps.

The vascular prostheses according to the present disclosure is suitable for a wide variety of therapeutic uses. Such therapeutic uses include the anastomosis of vessels, such as blood vessels. The vascular prosthesis can for example be implanted in vessels pertaining to the urethra, trachea, branchi, esophagus, biliary tract, and the like.

The vascular prosthesis aims at improving conventional side-to-end anastomosis techniques, by providing, among other advantages, a less invasive surgical approach.

In addition, in certain cases, the vascular prosthesis may avoid the use of an inflatable balloon. Moreover, compared to classical open surgery involving the use of clamps, examples of vascular prostheses according to the present disclosure offer the following non exhaustive list of advantages:

- reduces inguinal incision: 2 to 5 cm (versus 10 cm for surgery);
- reduces arterial dissection zone: 1 to 3 cm (versus 5 cm for surgery);
- avoids the use of arterial clamps (upstream and downstream the vessel);
- avoids suture by a vascular thread;
- avoids the placement of a drain;
- reduces the duration of anastomosis 1-4 minutes (versus 15-20 minutes).

The vascular prosthesis can for example be used to perform femoro-popliteal bypasses, which are associated with a complication rate of 37%, mostly related to the inguinal incision, with an average hospital stay of 10.2 days. The technical benefits of the vascular prosthesis according to the present disclosure allow a significant reduction in the rate of complications and a hospital stay divided by two.

The embodiments described above are not exhaustive. In particular, it is understood that additional embodiments can be considered on the basis of different combinations of the explicitly described embodiments. Unless otherwise specified in the present disclosure, it will be apparent to the skilled person that all the embodiments described above can be combined together. For example, unless otherwise specified, all features of the embodiments described above, whichever embodiment of the vascular prosthesis or the implanting sheath they refer to, can be combined with or replaced by other features from other embodiments.

The above description is given by way of example, and not limitation. Given the above disclosure, one skilled in the art could devise variations that are within the scope of the invention defined by the appended claims. In particular, the various features of the embodiments or examples disclosed herein can be used alone or in varying combinations with each other, and are not intended to be limited to the specific combinations disclosed herein. In other words, the structures and functions of the features of one embodiment can be adopted in another embodiment. Also, it is not necessary for all advantages of the invention to be present in a particular embodiment at the same time.

The invention claimed is:

1. A vascular prosthesis configured to be implanted in a vessel, having substantially a T-shape, comprising
    a proximal tubular part forming the base of the "T" and a distal tubular part forming the head of the "T", wherein:

the proximal tubular part has a first lumen, the distal tubular part has a second lumen, and the first and second lumens are fluidly connected to form a common lumen, wherein:

the distal tubular part comprises a first end portion, a second end portion, and an intermediate portion extending axially between the first and second end portions, the first and second end portions are radially expandable, the proximal tubular part is connected to the intermediate portion, and the second end portion is movable between a retracted position in which the second end portion is axially restrained and a deployed position in which the second end portion is axially deployed, wherein the second end portion comprises a folding region, so that, in the retracted position, the second end portion can be folded along the folding region so as to be folded within the second lumen, and wherein the second end portion comprises a distal end with a circumferential indentation, and wherein the circumferential indentation is configured to facilitate the folding along the folding region of the second end portion.

2. The vascular prosthesis according to claim 1, wherein the second end portion further comprises a frame that is not inverted within the second lumen in the retracted position, that is axially offset with respect to the distal end in the deployed position, and wherein the frame has the shape of an open annular ring in a radial cross-section of the second end portion, with two ridges defining a circumferential gap therebetween, said circumferential gap being radially opposed to and axially offset with respect to the indentation in the deployed position.

3. The vascular prosthesis according to claim 2, wherein the folding region extends axially between the frame and the distal end in the deployed position.

4. The vascular prosthesis according to claim 3, wherein the folding region comprises at least one pair of arms which are circumferentially offset.

5. The vascular prosthesis according to claim 4, wherein the arms are less rigid than the frame and/or are arranged on less than 50% of the circumference of the second end portion.

6. The vascular prosthesis according to claim 2, wherein the frame comprises stent struts.

7. The vascular prosthesis according to claim 1, wherein:
the intermediate portion is elastically deformable between an unstable state and a stable state, and
the deformation of the intermediate portion from the unstable state to the stable state makes the second end portion move from the retracted position to the deployed position.

8. The vascular prosthesis according to claim 1, wherein the intermediate portion comprises at least two arms extending in the axial direction of the distal tubular part.

9. The vascular prosthesis according to claim 8, wherein the at least two arms are axially pleated when the intermediate portion is in an unstable state.

10. The vascular prosthesis according to claim 8, wherein the at least two arms are constrained in a twisted manner when the intermediate portion is in an unstable state.

11. The vascular prosthesis according to claim 8, wherein the at least two arms are bent when the intermediate portion is in an unstable state, so that the second end portion is fully inverted within the second lumen.

12. An implantation sheath comprising the vascular prosthesis according to claim 1 and having a perforating head for penetrating a vessel.

13. Vascular A vascular prosthesis configured to be implanted in a vessel, having substantially a T-shape, comprising a proximal tubular part forming the base of the "T" and a distal tubular part forming the head of the "T", wherein the proximal tubular part has a first lumen, the distal tubular part has a second lumen, and the first and second lumens are fluidly connected to form a common lumen, wherein:

the distal tubular part comprises a first end portion, a second end portion, and an intermediate portion extending axially between the first and second end portions, the first and second end portions are radially expandable, the proximal tubular part is connected to the intermediate portion, and wherein:

the second end portion is movable between a retracted position in which the second end portion is axially restrained and a deployed position in which the second end portion is axially deployed, the intermediate portion is elastically deformable between an unstable state and a stable state, and the deformation of the intermediate portion from the unstable state to the stable state makes the second end portion move from the retracted position to the deployed position, wherein the intermediate portion comprises at least two arms extending in the axial direction of the distal tubular part; and wherein, when the intermediate portion is in the unstable state, the at least two arms are axially pleated, or constrained in a twisted manner, or bent so that the second end portion is fully inverted within the second lumen wherein the second end portion comprises a folding region, so that, in the retracted position, the second end portion can be folded along the folding region so as to be folded within the second lumen, and wherein the second end portion comprises a distal end with a circumferential indentation, and wherein the circumferential indentation is configured to facilitate the folding along the folding region of the second end portion.

* * * * *